United States Patent [19]

Pepper et al.

[11] Patent Number: 5,038,359
[45] Date of Patent: Aug. 6, 1991

[54] SELF-PUMPED, OPTICAL PHASE CONJUGATION METHOD AND APPARATUS USING PSEUDO-CONJUGATOR TO PRODUCE RETROREFLECTED SEED BEAM

[75] Inventors: David M. Pepper; Ruth A. Mullen, both of Malibu, Calif.

[73] Assignee: Hughes Aircraft Company, Los Angeles, Calif.

[21] Appl. No.: 419,308

[22] Filed: Oct. 10, 1989

[51] Int. Cl.⁵ .............................................. H01S 3/08
[52] U.S. Cl. ..................... 372/99; 359/300; 359/530; 359/529; 372/21
[58] Field of Search ................. 372/3, 9, 21, 99; 250/201.9, 201.1; 350/353, 354, 109, 102, 103; 356/360, 359

[56] References Cited

U.S. PATENT DOCUMENTS

| | | | |
|---|---|---|---|
| 4,648,092 | 3/1987 | Ewbank et al. | 372/18 |
| 4,762,397 | 8/1988 | Pepper | 350/331 R |
| 4,767,195 | 8/1988 | Pepper | 350/354 |
| 4,769,820 | 9/1988 | Holmes | 372/33 |
| 4,773,739 | 9/1988 | Valley et al. | 350/354 |
| 4,794,605 | 12/1988 | Aprahamian et al. | 372/9 |
| 4,831,333 | 5/1989 | Welch | 330/4.3 |
| 4,934,779 | 6/1990 | Dunning | 350/102 |

OTHER PUBLICATIONS

B. Ya. Zel'dovich et al., "*Principles of Phase Conjugation*", (Springer series in Optical Sciences; v. 42).
Günter, P. et al., "*Self-Pulsation and Optical Chaos In Self-Pumped Photorefractive BaTiO₃*", Optics Communications, Sep. 1, 1985, vol. 55, No. 3, pp. 210-214.
Cronin-Golomb, Mark, "*Theory and Applications of Four-Wave Mixing in Photorefractive Media*", IEEE Journal of Quantum Electronics, vol. QE-20, No. 1, Jan. 1984, pp. 12-30.
Feinberg, Jack, "*Self-Pumped Continuous-Wave Phase Conjugator Using Internal Reflection*", Optics Letters, vol. 7, No. 10, Oct. 1982, pp. 486-488.
Chang, Tallis Y. et al., "*Optical Phase Conjugation by Backscattering in Barium Titanate*", Optics Letters, vol. 10, No. 8, Aug. 1985, pp. 408-410.
Conference on Lasers and Electro-Optics, 1989 Technical Digest Series, vol. 11.
Valley, George, "*Competition Between Forward- and Backward-Stimulated Photorefractive Scattering in BaTiO₃*", Journal of Optical Society of America B, vol. 4, Jan. 1987, pp. 14-19.
Walker, Jearl, "*The Amateur Scientist*", Scientific American, Apr. 1986, vol. 254, No. 4, pp. 118-124.
Pepper, David, "*Observation of Diminished Specular Reflectivity from Phase-Conjugate Mirrors*", Physical Review Letters, vol. 62, No. 25, pp. 2945-2948.

*Primary Examiner*—Frank Gonzalez
*Assistant Examiner*—Galen J. Hansen
*Attorney, Agent, or Firm*—V. D. Duraiswamy; W. K. Denson-Low

[57] ABSTRACT

An optical input beam is transmitted through a non-linear medium capable of two-wave mixing gain by photorefractive, Brillouin, Raman, or other non-linear optical mechanism. A psuedo-conjugator retroreflects the input beam which has passed through the medium, back into the medium. The retroreflected beam acts as a seed, which lowers the threshold for producing a self-pumped conjugate reflected beam in the medium by stimulated scattering. The pseudo-conjugator may be a flat array of retroreflecting elements in the form of spheres or corner reflectors. A mosaic pattern of conjugating elements can be phase-locked to yield larger apertures and/or energy scaling, in a master-oscillator, power-amplifier (MOPA), or a four-wave mixer (FWM) configuration. The retroreflected beam can be modulated to temporally encode information onto the conjugate beam, and/or polarized to increase the system efficiency. The input and self-pumped conjugate reflected beams can be used as reference or pump beams in a FWM configuration.

40 Claims, 4 Drawing Sheets

SELF-PUMPED, OPTICAL PHASE CONJUGATION METHOD AND APPARATUS USING PSEUDO-CONJUGATOR TO PRODUCE RETROREFLECTED SEED BEAM

This invention was made with U.S. Government support under Contract No. N00014-87-C-0122, awarded by the Department of the Navy. The U.S. Government has certain rights in this invention.

CROSS-REFERENCE TO RELATED APPLICATION

This application is related to U.S. patent application Ser. No. 342,007, filed April 24, 1989, entitled "SYSTEM AND METHOD FOR LOW NOISE OPTICAL RETROREFLECTION WITH GAIN", by G. Dunning, assigned to Hughes Aircraft Company, the assignee of the present invention.

BACKGROUND OF THE INVENTION

1. Field of the Invention

The present invention generally relates to optical phase conjunction, and more specifically to the use of a pseudo-conjugator to produce a retroreflected seed beam in a self-pumped phase conjugate mirror configuration.

2. Description of the Related Art

A phase conjugate mirror produces a wavefront-reversed, or time-reversed reflection of an incident beam, with the phase of the reflected beam reversed from that of the incident beam at all points in space. Several methods of producing phase conjugated beams are known in the art, including four-wave mixing, stimulated Brillouin scattering (SBS), stimulated Raman scattering (SRS), and stimulated photorefractive scattering (SPS). A detailed treatise on these metods is presented in a textbook entitled "Principles of Phase Conjugation", by B. Ya. Zel'dovich et al, Springer-Verlag, Berlin (1985).

Phase conjugative mirrors can be provided either with external pumping beams, as in a four-wave mixer, or as self-pumped devices. The above referenced related patent application to Dunning utilizes a pseudo-conjugator employed in an externally pumped stimulated photorefractive scattering configuration. The self-pumped configuration is advantageous in that no optical beams other than the input beam are required. In a self-pumped phase conjugator, an input beam is directed into an optical non-linear medium capable of two-wave mixing gain. Scattering of the input beam in the medium results in the creation of a backscattered conjugate beam propagating in the direction opposite to the input beam, which has its phase fronts reversed throughout space relative to the input beam.

Once created, the conjugate beam is capable of being amplified through two-wave mixing with the input beam. In order to create the conjugate beam, a noise threshold condition has to be surpassed. Examples of noise sources in non-linear media include thermal noise and scattering from crystal imperfections. In order for the conjugate beam to be produced and sustained, it must be amplified sufficiently to overcome the noise threshold. In an SPS application, using a material such as crystalline barium titanate, and relying only on unseeded backscattering to produce the conjugate beam, the two-wave mixing gain must be enormous (on the order of $e^{30}$), to overcome the noise threshold. For Brillouin and Raman media, the exponent is the product of the material's gain coefficient g with the intensity of the input beam and the interaction length of the non-linear medium. In photorefractive media, the exponent is the product of the photorefractive gain coefficient times the interaction length. The photorefrative gain coefficient is linearly proportional to intensity only at very low intensities; at higher intensities above the equivalent dark intensity, the photorefractive gain coefficient is independent of it.

Sufficient gain to overcome the threshold without any kind of seeding is not always attainable in practical applications, since the input beam intensity, the material's gain coefficient, and/or the length of the medium may not be sufficiently large. Previous approaches to relax this constraint in SPS applications involve the use of "seeding" techniques, which cause the input beam to be reflected back through the non-linear medium as a "seed beam", and which has an intensity larger than the threshold value. Two classes of seeds which have been attempted involve conjugate seeds (a conjugator is placed downstream of the SPS crystal), and "noise seeds", in which case a diffuse reflector is placed beyond the SPS crystal or paiinted on the crystal directly (using, for example, white typewriter correction fluid). In the latter case, a noise source (as opposed to a specularly reflected seed), is required in order to avoid "image print-through", which occurs because the SPS crystal can amplify the reflected seed beam. An example of providing a diffuse conjugate seed is found in an article entitles "SELF-PULSATION AND OPTICAL CHAOS IN · SELF-PUMPED PHOTOREFRACTIVE BaTiO$_3$", by P. Gunter et al, Opt. Comm., vol, 55, no. 3, pp. 210–214.

The disadvantages of these two classes of seeds are as follows:

(1) a conjugate seed (even though spatially ideal) requires the use of another phase conjugate mirror, which complicates and adds to the cost of the system considerably; and (2) a diffuse seed (even though ideal in terms of generating a multiplicity of spatial modes) is inefficient due to the large degree of wide-angle light scattering which results in only a relatively small fraction of the diffusely scattered light finding its way back into the crystal. In addition, the painted diffuse scatterer has, in some cases, led to instabilities in the conjugate.reflectivity as described by Gunter et al., presumably due, in part, to a background specular component.

A further threshold related limitation which has existed in the prior art is that only a few crystalline materials, such as barium titanate and in one case lithium niobate, have sufficiently high internal gain and size to be usable in unseeded SPS conjugation applications.

Self-pumped phase conjugate mirrors employing SBS and SRS are generally employed in connection with high power pulsed laser beams, such as from a Nd:YAG laser, but do not work (at least in free-space bulk configurations) with lower power lasers such as the HeNe or argon-ion laser. In addition, the Stokes frequency shift inherent in these systems is undesirable in certain applications.

Previous schemes involving photorefractive interactions inlude external loop geometries as discussed in "Theory and Applications of Four-Wave Mixing in Photorefractive Media", by M. Cronin-Golomb et al, IEEE JQE, QE-20, no. 1 (1984), pp. 12–30, and internal loop geometries as discussed in "Self-pumped, continuous-wave phase conjugator using internal reflection", by J. Feinberg, Opt. Lett. vol 7, no. 10 (1982), pp. 486-488.

Another arrangement is disclosed in U.S. Pat. No. 4,794,605, issued Dec. 27, 1988, entitled "METHOD AND APPARATUS FOR CONTROL OF PHASE CONJUGATION CELLS", to R. Aprahamian et al, which teaches a technique in which one or more phase conjugation cells, such as SBS cells, are controlled by the use of a seed beam injected into the cells. The seed beam is injected at the same frequency and the same direction as the expected phase conjugated beam, and is adjusted to control the phase and other characteristics of the phase conjugated beam. In multiple cell arrays, seed beams are employed to ensure phase coherency of multiple beams. For lower energy applications, use of the seed beam allows a phase conjugation cell to be operated with incident beams of lower energy than would be needed without the seed beam.

Other schemes utilizing the internal geometries of SPS crystals are discussed in "Optical phase conjugation by backscattering in barium titanate", by T. Y. Chang et al, Opt. Lett. vol. 10, no. 8 (1985), pp. 408-410, and "Physics of speckle field interactions in photorefractive crystals", by A. V. Mamaev et al, 1989 CLEO Conference, Baltimore, Md.; paper MD4.

Another method of overcoming the gain limitations in SPS is disclosed in U.S. Pat. No. 4,773,739, issued Sept. 27, 1988, entitled "SELF-PUMPED PHASE CONJUGATE MIRROR AND METHOD USING AC-FIELD ENHANCED PHOTOREFRACTIVE EFFECT", to G. Valley et al, which teaches how to apply an alternating electric field across a photorefractive crystal to establish a photorefractive grating shift of about 90°, and bring the crystal gain up to a level at which phase conjugation can take place.

There are at least three important advantages of back-seeded SPS over the internal loop-type conjugator. First, since the interaction region in the seeded SPS geometry s distributed over a long length rather than over several very localized interaction regions, it should be easier to obtain accurate coupling of several beams from independent amplifier legs in master oscillator power amplifier applications. Second, since there are not internal loops, along with associated internal corner reflections of the intense filimentary beam, higher damage thresholds should be expected from the seeded SPS geometry. Finally, since the seeded SPS geometry involves the very small period gratings created by counterpropagating beams in the crystal, faster response times can be expected. Application of an external alternating electric field as taught in the patent to Valley may not be practical in certain applications.

SUMMARY OF THE INVENTION

The present invention involves the use of a photon seeding technique to overcome the threshold limitation in SBS, SRS, SPS, and other self-pumped, stimulated scattering phase conjugators. This is accomplished by providing a retroreflecting array or "pseudo conjugator" to redirect the transmitted beam back into the non-linear medium.

The purpose of the invention is to realize a simple method and apparatus to reduce the threshold of phase conjugators, and is particularly advantageous in the case of SPS conjugators as well as arrays, or mosaic configurations, of large numbers of conjugators that all need to be phase-referenced to a common beam. A pseudo conjugator represents a good compromise for providing the required seed beam. It partially conjugates the returned beam (resulting in good registration or overlap of the backward seed with the forward pump), and at the same time, assures that the seed will be noise, since it does not perfectly conjugate the transmitted beam. Moreover, it is more photon efficient than a diffuse scatterer, since it directs a large fraction of the retroreflected beam into a relatively small solid angle. The pseudo-conjugator seed is self-aligning, and easily scalable to large apertures, since it does not involve internal reflections, and is scalable to high energy systems. Finally, it is simple, lightweight, compact (in the form of flat sheets), inexpensive, and can be used in large sheets for energy scaling as well as for phase-locking of mosaic arrays of conjugators. This is important if a single conjugator cannot accommodate the total energy in the system, or if the maximum physical size of an individual conjugator is limited.

The present seeding technique can yield SPS conjugators in crystals that would otherwise be below the threshold condition without seeding. The conjugate fidelity has been shown to be high, and the crystals do not exhibit the undesirable instabilities seen with other techniques.

In accordance with the present invention, an optical input beam is transmitted through a non-linear medium capable of two-wave mixing gain by photorefractive, Brillouin, Raman, or other non-linear optical mechanism such as a locally responding non-linear media (e.g., atomic sodium vapor, GaAs, MQSs, $CS_2$, superlattice, multiple and/or strained layer quantum well structure, semiconductor microcrystallite, etc.) in the presence of moving gratings. A pseudo-conjugator retroreflects the input beam which has passed through the medium, back into the medium. The retroreflected beam acts as a seed, which lowers the threshold for generating a self-pumped conjugate reflected beam in the medium by stimulated scattering. The pseudo-conjugator may be a flat array of retroreflective elements in the form of spheres or corner reflectors. A mosaic pattern of conjugating elements can be phase-locked to yield larger apertures and/or energy scaling, in a master-oscillator, power-amplifier (MOPA), or a FWM configuration. The retroreflected beam seed can be modulated to temporally encode information onto the conjugate beam, and/or polarized to increase the system efficiency. The input and self-pumped conjugate reflected beams can be used as reference or pump beams in a FWM configuration.

In the case of SPS, the non-linear medium is in the form of a crystal, and is oriented at an angle relative to its crystalline axis which maximized backscattering of an input beam therein.

These and other features and advantages of the present invention will be apparent to those skilled in the art from the following detailed description, taken together with the accompanying drawings, in which like reference numerals refer to like parts.

DETAILED DESCRIPTION OF THE INVENTION

A phase conjugation apparatus embodying the invention is highly advantageous for energy scaling, beam combining, and interferometry. This class of conjugator can also be useful for such applications as lensless imaging (e.g., photolithography), remote sensors, retromodulators, and optical fiber link communication systems. It is broadband, and is further applicable to pulsed SBS conjugator technologies, which may include the addition of a frequency shift.

Figure 1:
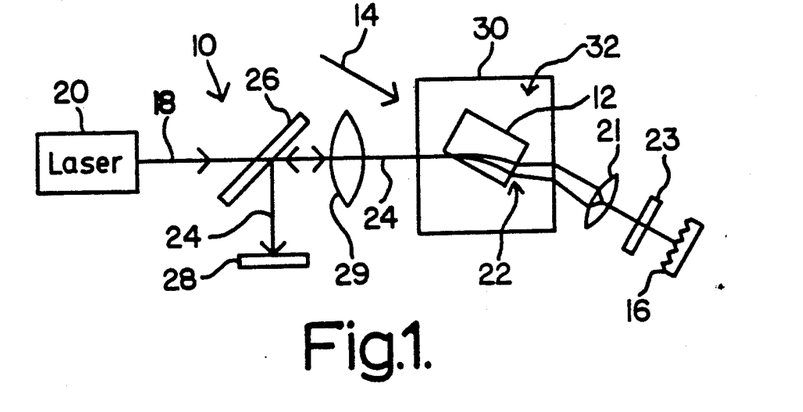
FIG. 1 is a diagram illustrating a first embodiment of the invention in an SPS configuration.

Referring now to FIG. 1 of the drawing, an optical phase conjugation apparatus employed in a phase conjugate mirror configuration as generally designated as 10 and includes a non-linear medium 12 capable of two-wave mixing by SPS. Typically, the medium 12 will be a material such as a single crystal of barium titanate ($BaTiO_3$), GaAs, or InP having a crystalline c-axis oriented as indicated by an arrow 14. In accordance with an important feature of the present invention, a retroreflector array 16, which acts as a pseudo-conjugator, is dispose behind the medium 12.

An input optical beam 18, which is preferably a coherent light beam produced by a laser 20, is directed into the medium 12 through a lower left edge thereof as viewed in the drawing. The angle between the input beam 18 and the crystalline axis 14 of the medium 12 is selected such that the beam 18 will be bent, or "framed", (via forward photorefractive scattering) in the medium 12 to produce a generally fan-shaped pattern in an interaction region 22. The input beam 18, after being refracted inside the medium 12, exits through a lower right edge thereof and impinges on the retroreflector array 16.

The array 16 is provided behind the medium 12 at a spaceing therefrom (which may be zero) and an angle selected to retroreflect the input beam back into the medium 12 along the same path at which it emerged from the medium 12. The retroreflected beam constitutes an optical seed beam having an intensity greater than the noise threshold of the photorefractive medium 12. This seed then lowers the threshold for stimulated backscattering so that a conjugate wave can form. This conjugate wave is then amplified through two-wave mixing interaction with the input beam 18 in the interaction region 22, and it propagates back through the medium 12 as a self-pumped phase conjugate beam 24.

Further illustrated in FIG. 1 is an optical beam splitter 26 which may be embodied as a one-way plane mirror. The input beam 18 produced by the laser 20 passes through the beam splitter 26 in the rightward direction as shown, and continues on through the medium 12. The conjugate seed beam is retroreflected by the array 16, and causes generation of the self-pumped conjugate beam 24 in the medium 12. The beam 24 passes through the medium 12 in the leftward direction, and is reflected downwardly by the beam splitter 26 as an output beam. The apparatus 10 thereby functions as a phase conjugate mirror, with the beam 24 being a phase conjugated reflection of the input beam 18. It will be understood that the input and conjugate beams 18 and 24 respectively and counterpropagating between the beam splitter 26 and medium 12.

The output beam 24 may be directed onto a photodetector 28 or the like in an experimental configuration, or external of the apparatus 10 in a practical application. An optical system, illustrated as including a converging lens 29, may be provided to focus the input beam 18 into the medium 12.

The apparatus 10 may further include an optical element such as a converging lens 21 disposed between the medium 12 and retroreflector array 16. The lens 21 functions to relay and/or image the input beam 18 onto the array 16 for more efficient operation, such by improving the fidelity and/or lowering the effecitve noise threshold of the medium 12. Further illustrated is a polarizer 23, which may be incorporated to remove any de-polarized seed component from the retroreflected beam. Typically, two-wave gain works best if the retroreflected beam has the same polarization as the incident beam. However, in some cases, the pseudo-conjugator can depolarize the retroreflected beam. The presence of such a component could cause degradation of the conjugate fidelity and/or an increase in the noise threshold of the medium 12. The relative positions of the lens 21 and polarizer 23 may be reversed, as required in a particular application.

The medium 12 may optionally be immersed in a container 30 filled with an index matching fluid 32. Where the material of the medium 12 is barium titanate, the fluid 32 should ideally have an index of refraction of about 2.4, selected to match that of the medium 12. The fluid 32 may be a petroleum product designated as "Code 40", manufactured by the Cargille Co., of Cedar Grove, N.J., with an index of refraction of 1.57. The input beam 18 is typically incident on the medium 12 at approximately 30° relative to the crystalline axis 14, or other angle which is empirically selected to optimize the photorefractive backscattering effect in the medium 12. A discussion of the angular dependence on forward and backward scattering is found in 'Competition between forward- and backward-stimulated photorefractive scattering in $BaTiO_3$", by G. Valley, J. Opt. Soc. Am. B/vol. 4, no. 1, Jan. 1987, pp. 14–18.

The application of an alternating electric field in the manner taught by Valley in the above referenced patent enhances the photorefractive-induced space-charge fields, while maintaining the desired 90° phase shift between the intensity interference pattern and the index of refraction grating in an SPS medium, thereby improving the phase conjugation efficiency. Application of a direct (non-alternating) electric field can reduce or eliminate the phase shift. Where required, the phase shift may be reinserted by reciprocating the retroreflector array 16 relative to the medium 12 in a sawtooth (ramp shaped) manner with respect to time, so as to induce a frequency shift, $\delta$, onto the seed beam. The resulting optical interference pattern therefore moves through the medium at a rate chosen (by $\delta$) so as to optimize the photorefraction response.

The array 16 includes a large number of closely packed, retroreflective elements, which are typically corner reflectors or spheres imbedded in a rigid or flexible sheet. Such arrays are commericially available at sporting-goods stores and automobile-accessory shops in the form of flexible plastic sheets sold as safety reflectors. The arrays are comparable to pure phase conjugate mirrors in that light incident on them is reflected back in a direction parallel to the incident light. This is in contrast to the operation of a plane mirror, which reflects light back at an angle which is different in general from that of the incident light.

The retroreflector array 16 may preferably be a section of "Special Effects Projection Screen #7615-900X", manufactured by the 3M Company. The screen includes a black sheet, in which are embedded a large number of transparent and translucent spheres having a diameter on the order of 47 microns. Approximately 35% of the surface of the sheet is covered with spheres. Although a large variety of alternative retroreflector arrays may be used within the scope of the invention, the 3M screen was found to have a particularly high retroreflective accuracy, on the order of 1°, and favorable noise properties.

The retroreflector arrays do not, however, produce a pure phase conjugated reflected beam, and are therefore called "pseudo-conjugators". This is because, although the beam reflected from each element is parallel to the incident beam, it is inverted and displaced therefrom by a small distance. In addition, the individual retroreflective elements produce a composite reflected wavefront which does not exactly correspond to the wavefron of the input beam. A pseudo-conjugator, where used as a retroreflector to produce a reflected conjugate seed in accordance with the present invention, is therefore advantageous in that it produces a narrow reflected seed beam, as opposed to diffuse reflectors as discussed above, and a "noisy" reflected seed beam which generates a multiplicity of spatial modes as opposed to a single spatial mode produced by a flat mirror in the case of an incident plane wave. The general principles of retroreflectors are presented in an article entitles "The Amateur Scientist", by Jearl Walker, Scientific American, vol. 254, no 4 (1986), pp. 118-124.

Figure 2:
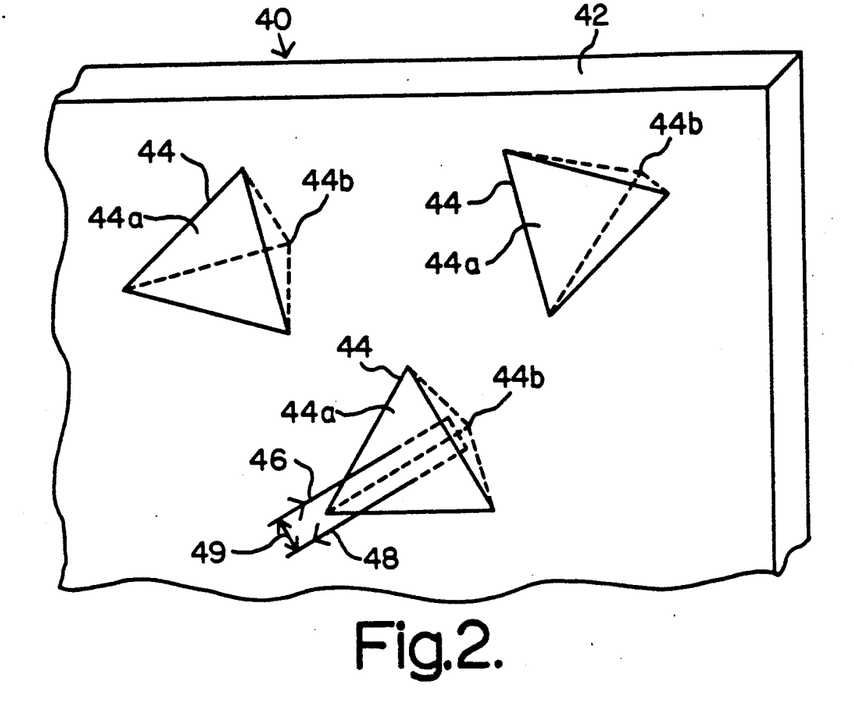
FIGS. 2 and 3 are fragmentary perspective views illustrating the principles of retroreflector arrays utilized in the invention.

A retroreflector array 40 utilizing the corner reflector or prism principle is illustrated in FIG. 2, and includes a generally flat, flexible supporting sheet 42 in which are imbedded a large number of small, closely spaced, transparent tetrahedral prisms 44. A variety of materials of this type are commercially available from the Reflexite Corporation of New Britain, Conn. The prisms 44 are oriented such that one face 44a thereof is parallel to the sheet 42, and a corner 44b opposite to the face 44a is embedded in the sheet 42. An input optical beam incident on the prism 44 along a path 46, is reflected from at least two internal faces of the prism 44, and emerges along a path 48 which is parallel and opposite to the path 46. The paths 46 and 48 are displaced by a distance 49, which is a function of the geometry of the prism 44.

Although not shown, the tetrahedral prisms 44 may be replaced by any othe configuration which produces at least partial retroreflection in accordance with the present invention. A possible modification of the prism 44 would be a shape having two, rather than three, intersecting faces, producing retroreflection from planar surfaces in two, rather than three dimensions. Whereas the prism 44 produces retroreflection from the interal faces thereof, it could be replaced by an equivalent hollow spape formed in the sheet 42 which produces retroreflection from external faces thereof.

Figure 3:
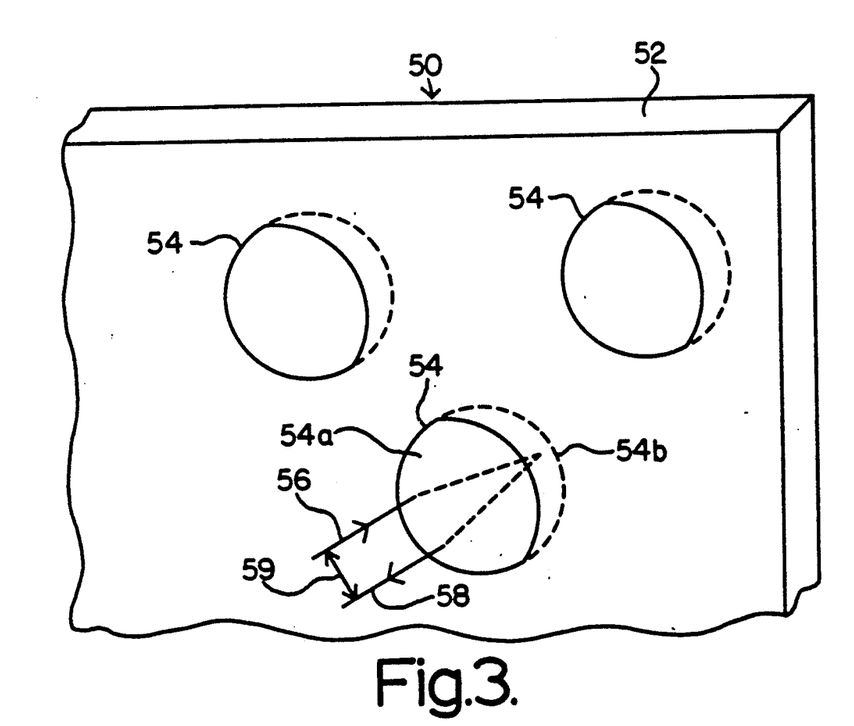

A second type of a retroreflector array 50 is illustrated in FIG. 3, and includes a sheet 52 in which are imbedded a large number of small transparent spheres 54 (the 3M screen #7615 discussed above is a preferred example of this type of retroreflector array). An input beam incident on each sphere 54 along a path 56 is refracted due to the curved convex shape of an exposed surface 54a of the sphere 54, and reflected from a curved internal surface 54b of the sphere 54 back along a path 58 which is parallel to the path 56, and displaced therefrom by a distance 59 corresponding to the diameter of the sphere 54.

Figure 4:
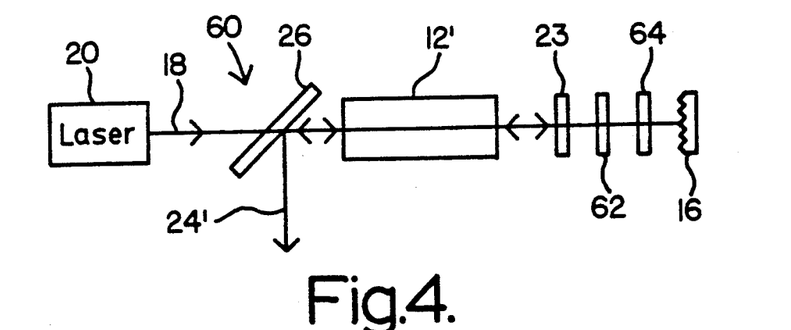
FIG. 4 is a diagram illustrating a second embodiment of the invention in an SBS or SRS configuration.

As discussed above, the present invention is applicable to other types of stimulated scattering, including SBS, SRS, stimulated Rayleigh-Wing Scattering (SRWS), etc. FIG. 4 shows an apparatus 60, in which corresponding elements are designated by the same reference numerals used in FIG. 1, and corresponding but modified elements are designated by the same reference numerals primed. The apparatus 60 includes a medium 12' including a non-linear material capable of SBS, SRS, or another form of stimulated scattering such as a locally responing non-linearity, (e.g., GaAs, Na vapor, or a Kerr medium such as $CS_2$). In this case, the required frequency downshift is on the order of GHz. For SBS, the mediium 12' will typically be embodied by a cell containing a gas such as $N_2$, Xe, $CH_4$, or $SF_6$.

In addition to the laser 20, beam splitter 26, and retroreflector array 16 shown in FIG. 1, the apparatus 60 includes a frequency shifter 62 for downshifting the frequency of the retroreflected conjugate beam, here designated as 24', relative to the frequency of the input beam 18, by an amount equal to the Stokes frequency of the material in the medium 12'. This is necessary to produce two-wave mixing by Brillouin amplification in the medium 12'. The frequency shifter 62 may be incorporated into an electro-optic modulator, acousto-optic modulator, or any other single or double pass device which produces the desired frequency shift. Typically, the downshift produced by the shifter 62 will be on the order of 100 MHz to 10 GHz for SBS, and 10 GHz to 1,000 GHz for SRS. Alternatively, a separate modulator 64 of any suitable type may be provided for purposes including temporal encoding of information onto the conjugate beam, and providing pulse encoding and/or switching.

EXAMPLE 1

The apparatus 10 illustrated in FIG. 1, employing the 3M screen #7615 as the retroreflector array, was used to demonstrate the basic principle of the present invention. With the retroreflector array 16 blocked, no phase conjugate beam 24 was observed. Upon unblocking of the array 16, the phase conjugate beam 24 began to build up, as evidenced by the appearance of an output signal from the photodetector 28, and the observation of Fresnel reflection from the inside face of the medium 12. As the reflectivity reached its steady-state value, the Fresnel reflection was seen to disappear, evidently the result of diminished specular reflectivity as discussed in a paper entitled "Observation of Diminshed Specular Reflectivity from Phase-Conjugate Mirrors", by David Pepper, Phys. Rev. Lett., vol. 62, no. 25 (1989), pp. 2945-2948. In the steady state, the apparatus 10 produced a conjugate beam reflectivity as high as approximately 60%, as measured by the photodetector 28.

EXAMPLE 2

Figure 5:
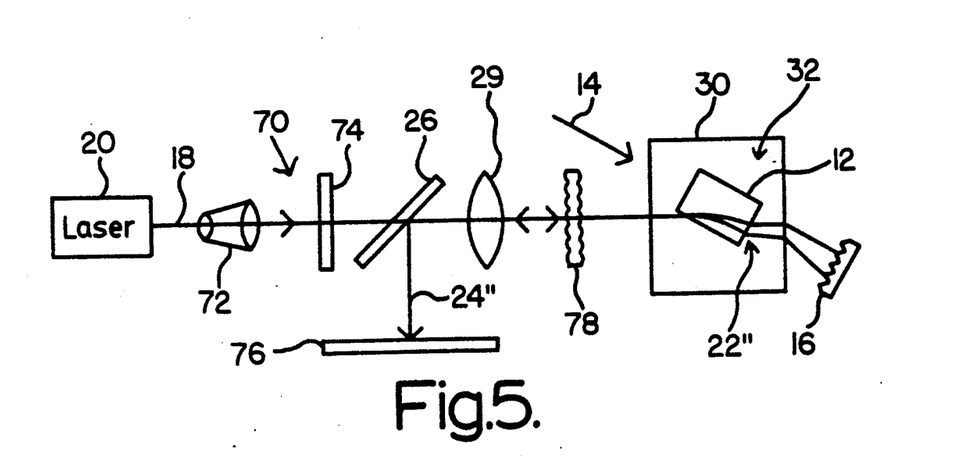
FIG. 5 is a diagram illustrating an experimental apparatus constructed to provide an example of the invention.

The apparatus 10 was modified as illustrated in FIG. 5 to demonstrate the conjugate fidelity achievable by the present invention. In FIG. 5, elements of an apparatus 70 common to those shown in FIG. 1 are designated by the same reference numerals, and corresponding but modified elements are designated by the same reference numerals double primed.

The input beam 18 from the laser 20 was expanded and collimated by a beam expander 72 to illuminate a transparent Air Force Resolution Chart, which was used as a test pattern 74. The input beam 18, modulated by the test pattern 74, was transmitted through the beam splitter 26, and converged by the lens 29 into the non-linear medium 12.

A photographic film 76 was provided to receive the conjugate beam, designated as 24", reflected from the beam splitter 26. Further illustrated is an aberrator 78 which was provided to distort the image of the test pattern 74.

The phase conjugate effectiveness of the invention was demonstrated by producing photographs of the conjugate beam 24" using the film at 76. Although the aberrator 78 severely distorted the image of the test pattern 74, the image was effectively restored in the conjugated beam 24" by passage thereof through the aberrator 78 in the opposite direction to the input beam 18. For comparison purposes, the array 16 was alternatively replaced by a plane mirror, and a surface coated with diffuse white paint. Both of these comparison tests produced highly distorted images of the test pattern 74, indicating a phase conjugation efficiency which was highly inferior to that produced by the retroreflector array 16.

Figure 6:
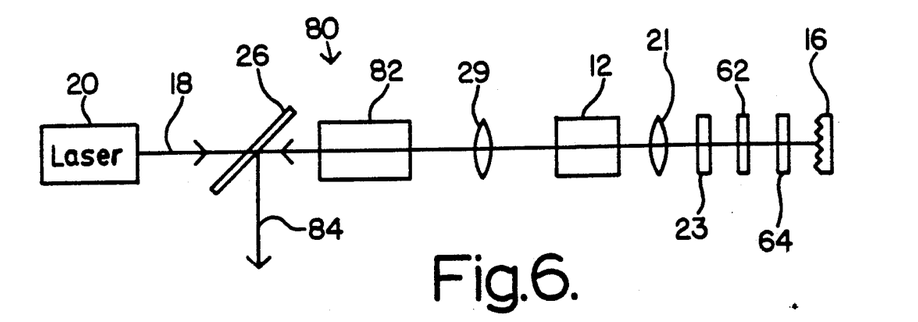
FIG. 6 is a diagram of an MOPA arrangement embodying the invention.

As illustrated in FIGS. 6 to 10, an optical phase conjugation apparatus embodying the present invention may be integrated into a variety of alternative optical devices. As shown in FIG. 6, an apparatus 80 includes an amplifier 82 disposed between the beam splitter 26 and converging lens 29 shown in the basic embodiments of FIGS. 1 and 4. The addition of the amplifier 82, which may be a laser amplifier or two-wave amplifier, expands the apparatus 80 into a master-oscillator, power amplifier (MOPA) configuration. Although the laser 20 may produce a relatively low power input beam 18, the input beam and conjugate reflected beam are amplified through two respective passes through the amplifier 82 to produce an intense output beam 84 which has high brightness, and is suitable for applications including lensless imaging. The converging lens 21, polarizer 23, phase shifter 62, and modulator 64, may optionally be provided in any combination and position relative to each other.

Figure 7:
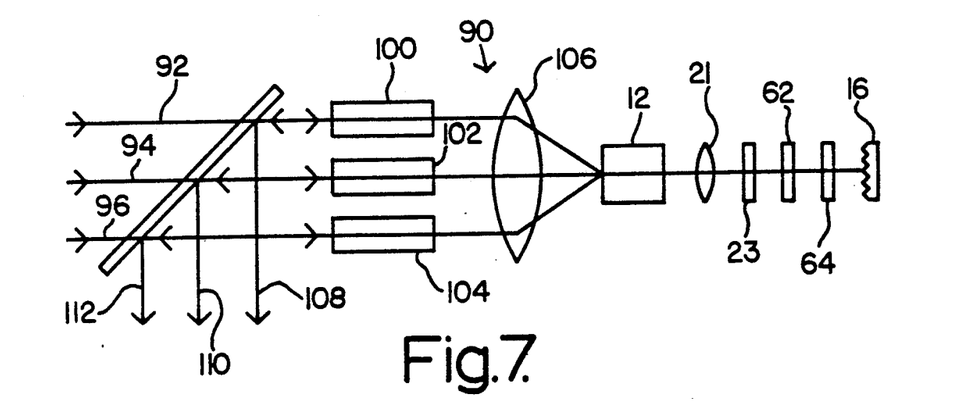
FIG. 7 is a diagram illustrating a phase-locked, multiple MOPA array of the invention.

Referring to FIG. 7, an apparatus 90 embodying the present invention receives three parallel input beams 92, 94, and 96, which may be generated by three separate sources, or may be generated by one source and split into three beams by means not shown. The input beams pass through a beam splitter 98 which is necessarily larger than the beam splitter 26, and further pass through three amplifiers 100, 102, and 104 respectively. The beams after amplification are converged into the medium 12 by an enlarged converging lens 106. The input beams are superposed into spatially overlapped relation with each other, co-propagate through the medium 12 and any desired auxiliary elements, and are retroreflected by the array 16. The self-pumped conjugate reflected beams counterpropagate through the apparatus and are reflected externally thereof by the beam splitter 98 as output beams 108, 110, and 112 respectively.

The basic operation of the apparatus 90 is similar to that of the apparatus 80. However, pseudo-conjugate reflection of the input beams by the retroreflective array 16 causes the output beams to be coherently coupled, or locked in phase with each other, in the manner described in the above referenced patent to Aprahamian et al. The present invention, however, constitutes an improvement over the arrangement taught by the patent in that the need for complicated and precise beam splitters to produce multiple back seed beams is eliminated.

Figure 8:
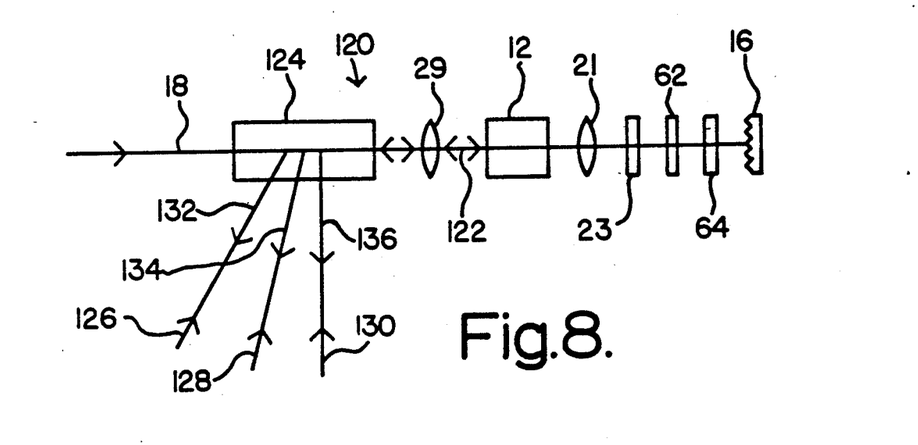
FIG. 8 is a diagram of a wide field-of-view, FWM conjugator embodying the invention.

Although the present invention achieves optical phase conjugation in a self-pumped configuration, without the necessity of external pump beams, it is possible to incorporate the basic concept of the invention into an apparatus which accomplishes mixing using more than two beams. FIG. 8 illustrates an apparatus 120 embodying the invention which utilizes the input and conjugate reflected beams of the embodiments of FIGS. 1 or 4 as pump or reference beams in a four-wave mixer (FWM) arrangement. As shown, the input beam 18 produces a self-pumped conjugate reflected beam 122 in the manner described above which counterpropagates with the beam 18 in the path between the lens 29 and medium 12, and also in a cell 124 containing a non-linear medium. The cell 124 may contain a gaseous material for SBS operation, or any other suitable material for a desired non-linear mixing process. Input or probe beams 126, 128, and 130, which may be parallel or non-parallel, are directed into the cell 124 at suitable angles. The counterpropagating beams 18 and 122 constitute pump or reference beams, and in conjunction with beams 126, 128, and 130, generate diffraction gratings in the material of the cell 124, causing scattering of the input beams to produce counterpropagating conjugate reflected beams 132, 134, and 136 respectively. The apparatus 120 may be embodied as a wide field-of-view FWM conjugator, providing correction of probe beam distortions, as well as phasing up (phase locking or coherent coupling) of the probe beams.

Figure 9:
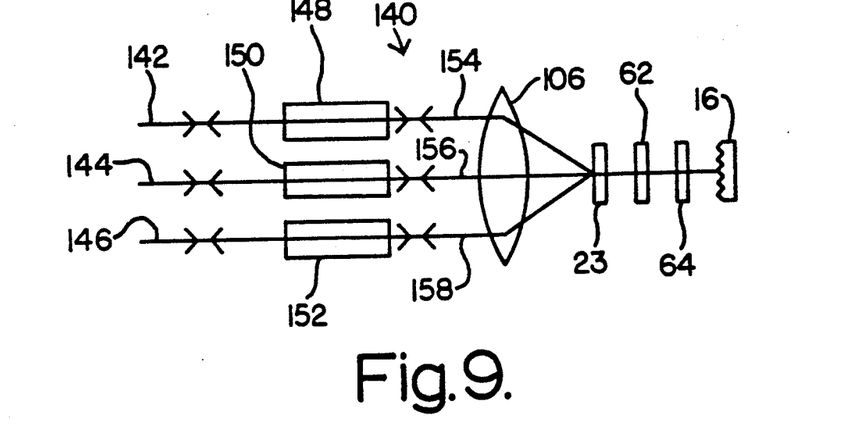
FIG. 9 is a diagram of a mosaic conjugator array of the invention.

FIG. 9 shows another apparatus 140 embodying the present invention, in which input beams 142, 144, and 146, are directed into non-linear media 148, 150, and 152 respectively. The media may be barium titanate crystals for SPS, or any other suitable non-linear material. In the apparatus 140, the input beams 142, 144, and 146 propagate through the respective media 148, 150, and 152, converging lens 106, and other elements of the apparatus in the manner described above to produce counterpropagating reflected conjugate beams 108, 110, and 112 from seed beams 154, 156 and 158 respectively. The conjugate reflected beams are coherently coupled, or locked together in phase, in the manner described above with reference to FIG. 7. The apparatus 140 constitutes a mosaic array of two-wave conjugators, which is effective for large aperture systems and for energy scaling. It circumvents finite energy limitations of individual two wave mixers by using a common pseudo-conjugate seed.

Figure 10:
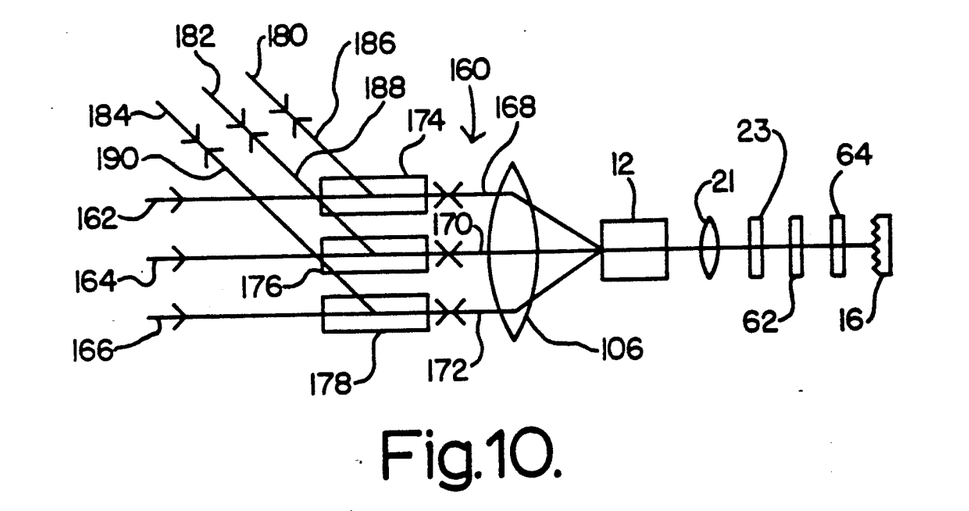
FIG. 10 is a diagram of a phase-locked, FWM conjugator array embodying the present invention.

FIG. 10 illustrates another apparatus 160 embodying the present invention, which receives input beams 162, 164, and 166, to produce counterpropagating conjugate reflected beams 168, 170, and 172 respectively in the manner described with reference to FIG. 7. The respective beams counterpropagate in non-linear media 174, 176, and 178 to constitute pump or reference beams, in the manner described above with reference to FIG. 8. Probe beams 180, 182, and 184 are directed into the media 174, 176, and 178, and are scattered by diffraction gratings generated by the reference beams, to produce conjugate reflected beams 186, 188, and 190 respectively. Each of the media embodies a four-wave mixer. The apparatus 160 is a phased-up mosaic array of four-wave conjugators which is especially effective in large aperture system applications.

Whereas the number of input and other corresponding beams in FIGS. 7 to 10 is shown as being three, the invention is not so limited, and any practical number of beams may be provided.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

We claim:

1. A self-pumped, optical phase conjugation apparatus, comprising:
   a non-linear optical medium means for self-pumped phase conjugation; and
   pseudo-conjugator retroreflector array means for retroreflecting an optical input beam transmitted through the medium means back into the medium means as a partially conjugated spatially diffuse seed beam which lowers the threshold necessary to generate a self-pumped phase conjugate beam in the medium means.

2. An apparatus as in claim 1, in which the medium means is capable of two-wave mixing gain by stimulated photorefractive scattering.

3. An apparatus as in claim 1, in which the medium means is photorefractive.

4. An apparatus as in claim 3, in which the medium means comprises crystalline barium titanate.

5. An apparatus as in claim 1, in which the medium means comprises a crystalline photorefractive material, and is oriented to receive the input beam at an angle to the crystalline axis of the material which causes photorefraction, and maximum backscattering of the input beam in the material.

6. An apparatus as in claim 1, in which the retroreflector array means comprises an array of retroreflecting elements.

7. An apparatus as in claim 6, in which the retroreflecting elements have curved surfaces.

8. An apparatus as in claim 7, in which the retroreflecting elements are spherical.

9. An apparatus as in claim 6, in which the retroreflecting elements have planar surfaces.

10. An apparatus as in claim 9, in which the retroreflecting elements are corner reflectors.

11. An apparatus as in claim 6, in which the array is substantially planar.

12. An apparatus as in claim 1, in which the medium means is capable of two-wave mixing gain by stimulated Brillouin scattering.

13. A self-pumped optical phase conjugation apparatus, comprising:
    a non-linear medium means for achieving two-wave mixing gain by stimulated Brillouin scattering;
    pseudo-conjugator means for retroreflecting an optical input beam transmitted through the medium means back into the medium means as a partially conjugated, spatially diffuse seed which lowers the threshold necessary to generate a self-pumped phase conjugate beam in the medium means; and
    frequency shifting means disposed between the medium means and the pseudo-conjugator means for downshifting said retroreflected beam relative to the input beam by a frequency equal to the Stokes frequency of the medium means.

14. An apparatus as in claim 1, in which the medium means is capable of two-wave mixing gain by stimulated Raman scattering.

15. A self-pumped optical phase conjugation apparatus, comprising:
    a non-linear medium means for achieving two-wave mixing gain by stimulated Raman scattering;
    pseudo-conjugator means for retroreflecting an optical input beam transmitted through the medium means back into the medium means as a partially conjugated, spatially diffuse seed which lowers the threshold necessary to generate a self-pumped phase conjugate beam in the medium means; and
    frequency shifting means disposed between the medium means and the pseudo-conjugator means for downshifting said retroreflected beam relative to the input beam by a frequency equal to the Stokes frequency of the medium means.

16. An apparatus as in claim 1, in which the medium means is capable of two-wave mixing gain by stimulated Rayleigh-Wing scattering.

17. An apparatus as in claim 1, in which the medium means is capable of stimulated scattering due to locally responding non-linearity therein.

18. A self-pumped, optical phase conjugation apparatus, comprising:
    a non-linear optical medium means for self-pumped phase conjugation;
    pseudo-conjugator means for retroreflecting an optical input beam transmitted through the medium means back into the medium means as a partially conjugated, spatially diffuse seed which lowers the threshold necessary to generate a self-pumped phase conjugate beam in the medium means; and
    polarizing means disposed between the medium means and the pseudo-conjugator means for blocking a de-polarized component of said retroreflected beam.

19. A self-pumped, optical phase conjugation apparatus, comprising:
    a non-linear optical medium means for self-pumped phase conjugation;
    pseudo-conjugator means for retroreflecting an optical input beam transmitted through the medium means back into the medium means as a partially conjugated, spatially diffuse seed which lowers the threshold necessary to generate a self-pumped phase conjugate beam in the medium means; and
    modulator means disposed between the medium means and pseudo-conjugator means for modulating said retroreflected beam.

20. An apparatus as in claim 1, further comprising amplifier means for amplifying the input beam prior to transmission thereof through the medium means the amplifier means being disposed to further amplify the self-pumped phase conjugate beam in counterpropagation with the input beam.

21. An apparatus as in claim 1, further comprising optical converging means disposed between the medium means and the retroreflector array means for converging the input beam onto the retroreflector array means.

22. A self-pumped, optical phase conjugation apparatus, comprising:
   a non-linear optical medium means for self-pumped, phase conjugation; and
   pseudo-conjugator means for retroreflecting a plurality of spatially overlapped, optical input beams transmitted through the medium, back into the medium in coherent coupled relation with each other.

23. An apparatus as in claim 22, in which the input beams are spatially displaced from each other prior to transmission through the medium means the apparatus further comprising optical converging means for converging the input beams into the medium means in spatially overlapped relation with each other.

24. An apparatus as in claim 23, further comprising a plurality of amplifier means for amplifying the respective spatially displaced input beams prior to transmission thereof through the medium means, the amplifier means being disposed to further amplify self-pumped conjugate beams generated by the medium means in response to said respective retroreflected beams, in counterpropagation with the respective input beams.

25. A self-pumped, optical phase conjugation apparatus, comprising:
   a plurality of non-linear optical medium means for self-pumped phase conjugation;
   pseudo-conjugator means for retroreflecting; and
   optical converging means for converging optical input beams transmitted through the plurality of medium means respectively into the pseudo-conjugator means in spatially overlapped relation with each other;
   the pseudo-conjugator means retroreflecting the spatially overlapped optical input beams transmitted through the respective medium means as partially conjugated, spatially diffuse reflected seed beams, back into the respective medium means in coherent coupled relation with each other.

26. An optical phase conjugation apparatus, comprising:
   a first non-linear optical medium;
   a second non-linear optical medium;
   pseudo-conjugator means for retroreflecting an optical input beam sequentially transmitted through the first and second media, back into the second medium to generate a self-pumped conjugate beam which counterpropagates with the input beam in the first and second media;
   the input and self-pumped conjugate beams in the first medium constituting reference beams; and
   means for directing an optical probe beam into the first medium at an angle relative to the reference beams predetermined to generate a phase conjugate reflected beam through interaction of the probe beam with the reference beams.

27. An optical phase conjugation apparatus, comprising:
   a first non-linear optical medium;
   a second non-linear optical medium;
   pseudo-conjugator means for retroreflecting an optical input beam sequentially transmitted through the first and second media, back into the second medium to generate a self-pumped conjugate beam which counterpropagates with the input beam in the first and second media;
   the input and self-pumped conjugate beams in the first medium constituting reference beams; and
   means for directing a plurality of optical probe beams into the first medium at angles relative to the reference beams predetermined to generate respective phase conjugate reflected beams which are coherently coupled with each other through interaction of the probe beams with the reference beams.

28. An apparatus as in claim 27, in which the probe beams are non-parallel to each other.

29. An optical phase conjugation apparatus, comprising:
   a plurality of first non-linear optical media;
   a second non-linear optical medium;
   optical converging means for spatially converging optical input beams transmitted through the first media respectively into the second medium;
   pseudo-conjugator means for retroreflecting the spatially overlapped input beams transmitted through the second medium, back into the second medium in coherent coupled relation with each other;
   said retroreflected beams counterpropagating with the input beams in the second medium to generate respective self-pumped conjugate beams which further counterpropagate with the input beams in the respective first media;
   the input and self-pumped conjugate beam in each first medium constituting reference beams; and
   means for directing an optical probe beam into each respective first medium at an angle relative to the reference beams predetermined to generate a phase conjugate reflected beam through interaction of the probe beam with the reference beams.

30. A method of self-pumped phase conjugation of an optical input beam, comprising the steps of:
   (a) directing the input beam into a non-linear optical medium; and
   (b) retroreflecting the input beam transmitted through the medium back into the medium as a partially conjugated, spatially diffuse retroreflected beam, said retroreflected beam acting as a seed which lowers the threshold necessary to generate a self-pumped phase conjugate beam in the medium.

31. A method as in claim 30, in which the medium is capable of stimulated photorefractive scattering, step (a) including directing the input beam into the medium at an angle which causes photorefraction, and maximum backscattering of the input beam in the medium.

32. A method as in claim 30, in which the medium is capable of stimulated Brillouin scattering, the method further comprising step of:
   (c) downshifting said retroreflected beam relative to the input beam by a frequency equal to a Stokes frequency of the medium.

33. A method as in claim 30, in which the medium is capable of stimulated Raman scattering, the method further comprising step of:
   (c) downshifting said retroreflected beam relative to the input beam by a frequency equal to a Stokes frequency of the medium.

34. A method as in claim 30, in which the medium is capable of stimulated Rayleigh-Wing scattering.

35. A method as in claim 30, in which the medium is capable of stimulated scattering due to locally responding non-linearity therein.

36. A method of optical phase conjugation, comprising the steps of:
(a) amplifying a plurality of optical input beams, each by a respective amplifier;
(b) directing the amplified input beams into a non-linear medium in spatially overlapped relation to each other;
(c) retroreflecting the input beams transmitted through the medium back into the medium as partially conjugated, spatially diffuse retroreflected beams, said retroreflected beams coherently coupled with each other.

37. A method of optical phase conjugation, comprising the steps of:
(a) causing an optical input beam to be sequentially transmitted through first and second non-linear media;
(b) retroreflecting the input beam back into the second medium to generate a self-pumped conjugate beam which counterpropagates with the input beam in the first and second media, the input and self-pumped conjugate beams in the first medium constituting reference beams; and
(c) directing an optical probe beam into the first medium at an angle relative to the reference beams predetermined to generate a phase conjugate reflected beam through interaction of the probe beam with the reference beams.

38. A method of optical phase conjugation, comprising the steps of:
(a) causing an optical input beam to be sequentially transmitted through first and second non-linear media;
(b) retroreflecting the input beam back into the second medium to generate a self-pumped conjugate beam which counterpropagates with the input beam in the first and second media, the input and self-pumped conjugate beams in the first medium constituting reference beams; and
(c) directing a plurality of optical probe beams into the first medium at angles relative to the reference beams predetermined to generate respective phase conjugate reflected beams which are coherently coupled with each other through interaction of the probe beams with the reference beams.

39. A method of optical phase conjugation, comprising the steps of:
(a) causing optical input beams to be sequentially transmitted through a plurality of first non-linear media respectively;
(b) converging the input beams transmitted through the first media into a second non-linear medium into spatially overlapped relation to each other;
(c) retroreflecting the spatially overlapped input beams transmitted through the second medium back into the second medium in coherent coupled relation with each other to generate respective self-pumped conjugate beams which further counterpropagate with the input beams in the respective first media, the input and self-pumped conjugate beams in each first medium constituting reference beams; and
(d) directing an optical probe beam into each of the respective first media at an angle relative to the reference beams predetermined to generate a phase conjugate reflected beam through interaction of the probe beam with the reference beams.

40. An apparatus as in claim 1, in which the medium means is capable of stimulated scattering and the apparatus further comprises frequency shifting means disposed between the medium means and the retroreflector array means for shifting the frequency of said retroreflected beam relative to the input beam.

* * * * *